3,146,883
METHOD OF COATING AND INKING POLYSTY-
RENE FILM AND RESULTANT ARTICLE
George M. Harlan, New Brunswick, and James Fanuzzi,
Franklin Township, N.J., assignors to Union Carbide
Corporation, a corporation of New York
Filed Oct. 2, 1961, Ser. No. 142,168
10 Claims. (Cl. 206—59)

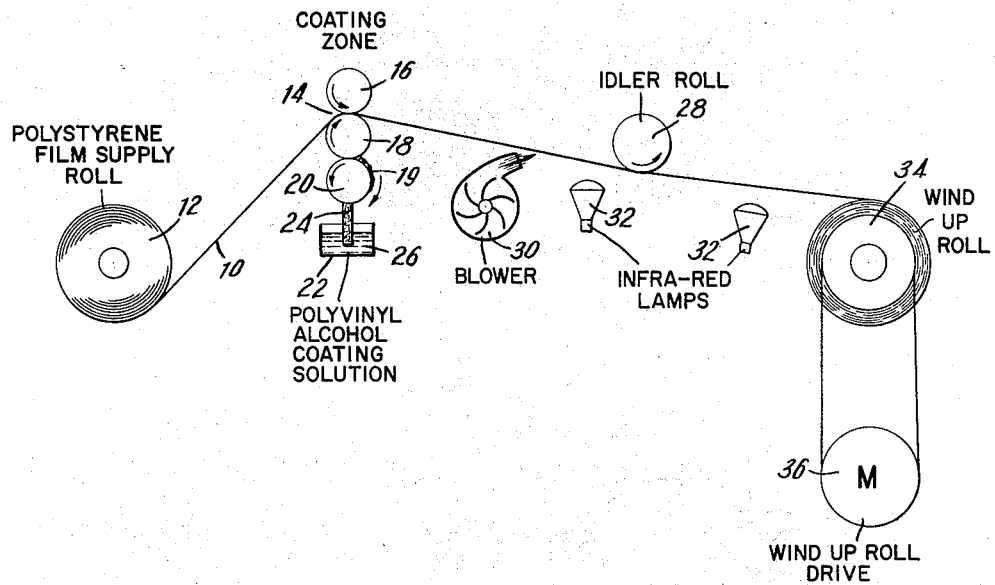

This invention relates to polystyrene film having transparency and surface characteristics which enable reception and retention of sharply defined ink characters and the projection of clear images therefrom. More particularly, the invention relates to polystyrene film having transparency and surface characteristics which enable the printing and projection in rapid succession of sharply defined ink characters.

Character bearing transparent films are widely used to disseminate pictorial and literal information to large groups of people by the interposition of the transparent film between a light source and a magnifying lens to project the printed characters on the screen. A demanding application for transparent projection film is as "ticker tape." In practice a printing head in response to electrical signal imprints stock symbols and price quotations on a tape fed thereto, which tape is immediately thereafter passed in front of the projection light source. The ink on the film is normally still wet when the projection zone is reached. It is readily appreciated that the surface characteristics required of films to be used in this type of projection are highly critical. A presently popular film meeting the stringent surface ink receptivity and image retentivity requirements is cellulose triacetate. This film, however, is inherently brittle and must be highly plasticized, e.g., with from 5 to 25% of triphenyl phosphate. As is well known, the presence of plasticizers in a film means weight loss, thermal embrittlement and dimensional instability upon film aging, particularly at the high temperatures experienced when the film is closely adjacent high wattage illumination as during projection.

Numerous synthetic organic thermoplastic films have been developed through the years, but few have provided the proper balance of heat stability, transparency and flexibility required of film to be used for projection transparencies. A thermoplastic candidate offering all of the above properties is polystyrene film. The disadvantage of heretofore known polystyrene films, however, has been the inability to form sharp clear images with the presently widely used glycol based printing inks on the film surface. Conventional polystyrene film surfaces are hydrophobic and these printing ink formulations coalesce on the film surface, leaving erratic ponds of ink rather than the intended character or image. Nor do the conventional treatments for rendering polystyrene film surfaces hydrophilic, such as flame treating and chemical reaction, provide a suitable surface for printing and projecting in rapid succession. These treatments render the film surface too hydrophilic so that although the images and characters are initially well received on the film surface, their nearly immediate exposure to high temperature environment such as the vicinity of a lighted projector bulb causes the still wet printing ink to diffuse slowly and irregularly into adjacent areas, much like the phenomenon associated with writing with a fountain pen on a blotter. The phenomenon of ink diffusion under heat is termed "feathering." Obviously, feathering will cause the images projected from the transparency to be hazy and to appear out of focus.

It is an object, therefore, of the present invention to provide polystyrene film in all respects suitable for projection transparencies.

It is another object to provide polystyrene film having a surface adapted to receive and retain sharply defined pictorial images and literal and numerical characters even at elevated temperatures without feathering.

It is still another object to provide polystyrene projection transparency material adapted to printing and projecting clearly defined images in rapid succession at elevated temperatures and for prolonged periods without feathering.

It is yet another object to provide a polystyrene stock ticker tape.

It has now been discovered that the above objects are achieved by the present invention with polystyrene film having a coating thereon comprising a polyvinyl alcohol. Polyvinyl alcohol coated polystyrene films are outstandingly receptive to glycol based printing inks, retain sharp images for long periods even at elevated temperatures and possess excellent transparency as well.

It is to be noted that the advantage in printability secured by the present invention is accomplished without any sacrifice in film gloss or transparency, so that the printability feature is superadded to the customary attractiveness and practicality of polystyrene film.

Polyvinyl alcohol, as the term is used in the present specification and claims, refers to the normally solid polymeric material soluble in water, insoluble in most organic solvents and characterized by the presence of

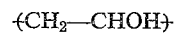

$$-(CH_2-CHOH)-$$

units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is commonly referred to as the "degree of hydrolysis" of the polyvinyl alcohol thus formed and indicates the percent of hydroxyl groups present in the polyvinyl alcohol out of the total number of theoretically possible hydroxyl group substituents. It is preferred to employ substantially completely hydrolyzed polyvinyl alcohols in this invention. By the term "substantially completely hydrolyzed" in the present specification and claims is meant a degree of hydrolysis above about 85%. We have found that polyvinyl alcohols having a hydroxyl content above 88% and particularly above about 95% provide superior coatings in terms of printability, clarity and flexibility. Polyvinyl alcohols having hydroxyl group contents of 99% to 100% are particularly preferred for use in this invention.

Generally speaking, the higher the molecular weight of the polyvinyl alcohol, the greater is the obtained improvement in printability of the final coated polystyrene film. Higher molecular weight polymers, however, are less soluble in water than intermediate and lower molecular weight polymers. The characteristic ease of incorporation and water dissolution of the intermediate and lower molecular weight polymers make these polymers preferable from a processing standpoint. The relative molecular weight of polyvinyl alcohols can be conveniently determined by preparing a 4% by weight aqueous solution of the polymer and determining the viscosity in centipoises at 20° C. by the Hoeppler Falling Ball Method described by F. Hoeppler in "Viscosity Measurement of Method Substances and a New Universal Viscometer" Chem. Zeitung 59 62–63 (1933). Polyvinyl alcohols having molecular weights as determined by the Hoeppler method which provide viscosities, herein denoted as "4% viscosity," of between about 2 and 50 and especially 4 to 32 centipoises are preferred in this invention. The polyvinyl alcohol coating compositions are applied most conveniently as aqueous solutions in concentrations ranging from about one to about thirty percent by weight. The higher molecular weight polyvinyl alcohols, e.g., those having a 4% viscosity of 10 to 50, are ordinarily applied at concentrations the higher end of the above range, e.g., ten to thirty percent. Other polar hydroxylated liquids, e.g., the lower alcohols such as ethanol and isopropanol, can be used as solvents for the polyvinyl alcohols either alone or preferably mixed with equal or greater weight amounts of water to increase the drying rate of the aqueous coating solutions. Hence, by the term "aqueous solution" there is intended to be included mixtures of water with up to equal weight amounts of other polar hydroxylated solvents. The polyvinyl alcohol coating remains uncrosslinked throughout the coating and drying operation.

The polystyrene films useful in this invention are those fabricated by any of the means known to the art, e.g., slit extrusion and bubble extrusion from normally solid film forming polystyrene and can be unoriented, uniaxially oriented, or biaxially oriented. The inclusion in the polystyrene of pigments and dyes, antioxidants, fillers and modifiers and other conventional additives is within the scope of the present invention.

It is essential that the polystyrene film surface to be coated be "hydrophilic," by which term is meant that a thin layer of water placed on the film as by a sponge will not break into discrete islands of liquid within ten seconds of application. While any known physical or chemical techniques for rendering polystyrene film hydrophilic can be used, e.g., flame treating and chemical reagents, the most convenient method comprises subjecting the polystyrene film to a corona discharge by passing the film over an insulated roller, e.g., insulated with Mylar (trademark for polyethylene terephthalate) while discharging a high frequency current, e.g., 250–450 kilocycles through the film. If desired, wetting agent additives can be incorporated into the polyvinyl alcohol coating material, either alternatively or additionally to preconditioning the polystyrene film, provided such incorporation does not adversely affect the surface tension characteristics required of the polyvinyl alcohol coating. The polyvinyl alcohol must be able to wet the polystyrene film, that is, form a continuous thin non-breaking fluid layer thereon. The polyvinyl alcohol coatings can be placed on the polystyrene film in any manner assuring a continuous covering over the desired surface area. Brushing, dipping, spraying and roller coating are illustrative means. A particularly desirable coating technique utilizes two and preferably three coacting rolls to transfer a solution of the polyvinyl alcohol to the polystyrene film surface.

The method, in general, comprises withdrawing a solution of a polyvinyl alcohol in convenient solvent from a reservoir, passing the solution by a suitable transferring and thickness controlling means, e.g., a pair of rollers in rolling contact one with another, to the surface of the film by an applicator means, suitably a roller, in rolling contact with the film surface area to be coated.

An apparatus adapted to carry out the above method will now be described in conjunction with the attached drawing wherein the single figure is a schematic view of one form of equipment and sequence of processing steps for carrying out the present method.

In the figure, thermoplastic film 10 is drawn from supply roll 12 to a coating zone generally indicated at 14 comprising rollers 16, 18 and 20. A coating solution withdrawal means, wick 24, extends from beneath the surface of coating solution 26 in coating solution supply tank 22 to roller 20 with which wick 24 is in scraping contact. In operation, the wick 24 draws the coating solution from the supply tank 22 by capillarity; the roller 20 picks up the coating solution from wick 24 and carries it to the nip formed by rollers 20 and 18. There the coating solution is distributed evenly in extent and depth while being transferred from roller 20 to roller 18. Excess coating solution, indicated at 19, drips back to tank 22. Roller 18 then carries a uniform thickness of coating solution to the film 10 which is being drawn from supply roll 12 through the nip formed by rollers 18 and 16. The roller 16 is mounted to apply pressure on the upper surface of the film 10, pressing the film 10 into intimate and uniform contact with the coating solution being carried by roller 18. The adjustment of the width of the nip between rollers 18 and 16 will vary the thickness of the coatings obtained. The obtaining of coatings 0.0003 to 0.0004 mils thick is readily accomplished with this apparatus and method. The film 10 once coated is drawn over an idler roll 28 to a solvent evaporation zone comprising for example blower 30 and infra-red lamps 32. Other combinations of heat and air motion will be equally effective. The film 10 is then wound on the wind-up roll 34 driven by motor 36.

The following examples are presented to further illustrate and describe the invention. All parts and percentages are by weight unless otherwise stated. In each of the examples the polystyrene film was first subjected to corona discharge to render the surface hydrophilic by the aforementioned test. The coating was then applied using an apparatus like that shown in the attached drawing.

EXAMPLE 1

A sheet of transparent and glossy biaxially oriented film of styrene homopolymer 0.001 inch thick was coated with a one percent aqueous solution of polyvinyl alcohol. The particular polyvinyl alcohol used had a 4% viscosity by the Hoeppler Falling Ball method of 4–6 centipoises at 20° C. and was 99% hydrolyzed. The coating apparatus used was that shown in the drawing. This film was passed through a Western Union Ticker at a rate of about one foot per minute and was printed on the coated side with various letters using a glycol base printing ink comprising pigment, diethylene glycol, triethylene glycol and butyl Carbitol and having a surface tension of 28 dynes/centimeter. Immediately upon printing the film was passed to the projection zone several inches away and there exposed to light. The then still wet ink did not feather.

In an additional test a series of clear, sharply defined literal characters was printed by hand with steel type on the polystyrene film. Exposure to a lighted 1000 watt bulb at a distance of three inches for ten minutes to simulate actual projection conditions did not cause any loss of definition in the printed characters. No feathering occurred.

EXAMPLE 2

A sheet of transparent and glossy biaxially oriented film of styrene homopolymer 0.001 inch thick was coated with a thirty percent solution of polyvinyl alcohol in a 3:4 mixture of water:ethanol. The particular polyvinyl alcohol used had a 4% viscosity by the Hoeppler Falling Ball method of 28–32 centipoises at 20°C. and was 88% hydrolyzed. The coating apparatus was the same as in Example 1. The film was printed on the coated side with various letters using the ink of Example 1. A series of clear, sharply defined literal characters was obtained on the polystyrene film. Exposure to a lighted 1000 watt bulb at a distance of three inches for ten minutes to simulate actual projection conditions did not cause any loss of definition in the printed characters. No feathering occurred.

*Control 1*

A sheet of transparent and glossy biaxially oriented polystyrene film was subjected to corona discharge to render the surface hydrophilic. This film, uncoated, was printed on with the printing ink formulation of Example 1. The ink constituting the characters formed sharp images. Upon exposure to the lighted 1000 watt bulb at a distance of three inches for ten minutes, however, the ink diffused from the character boundaries and poor definition resulted. This feathering of the wet ink was directly attributable to the heated environment. This film-ink combination also feathered when printed upon in a Western Union Ticker in the manner of Example 1.

*Control 2*

A sheet of transparent and glossy biaxially oriented polystyrene film 0.001 inch thick which had not been subjected to corona discharge was printed on, uncoated, with the printing ink formulation of Example 1. The ink constituting the characters balled together and the characters were illegible.

The invention has been illustrated using a printing ink comprising pigment in a glycol type vehicle. Other than the glycol base, the type of ink used is in no way critical, and other ink formulations can, of course, be used. All inks comprise several or all of the following: pigments, fillers, modifying resins, organic dyes, liquid carriers, flow control agents and leveling agents and are prepared by grinding or micropulverization or other means known to the art.

What is claimed is:

1. Projection transparency film adapted to receive, retain and project sharply defined pictorial images and literal and numerical characters at elevated temperatures without feathering which comprises a transparent and glossy polystyrene film base sheet having a hydrophilic surface, and on said surface a coating comprising polyvinyl alcohol having a 4% viscosity of from 2 to 50 centipoises and on said coating glycol based ink configurations.

2. Projection transparency film adapted to receive, retain and project sharply defined pictorial images and literal and numerical characters at elevated temperatures without feathering which comprises a transparent and glossy polystyrene film base sheet having a hydrophilic surface, and on said surface a coating comprising a substantially completely hydrolyzed polyvinyl alcohol having a 4% viscosity of from 4 to 32 centipoises and on said coating glycol based ink configurations.

3. Stock ticker tape adapted to receive, retain and project in rapid succession sharply defined literal and numerical characters at elevated temperatures without feathering which comprises a transparent and glossy polystyrene film base sheet having a hydrophilic surface, and on said surface a coating comprising polyvinyl alcohol having a 4% viscosity of from 2 to 50 centipoises and on said coating literal and numerical glycol based ink characters.

4. Stock ticker tape claimed in claim 3 wherein the film is a roll adapted to have successive portions thereof intermittently printed upon and immediately thereafter drawn past a light source.

5. Stock ticker tape claimed in claim 4 wherein the polyvinyl alcohol is 88% hydrolyzed and has a 4% viscosity of from 28 to 32 centipoises and the glycol based ink has a surface tension of about 28 dynes/cm.$^2$.

6. Stock ticker tape claimed in claim 4 wherein the polyvinyl alcohol is 99% hydrolyzed and has a 4% viscosity of from 4 to 6 centipoises and the glycol based ink has a surface tension of about 28 dynes/cm.$^2$.

7. Method for the preparation of polystyrene film able to receive and retain sharply defined wet pictorial images and literal and numerical characters at elevated temperatures without feathering comprising rendering a surface of the polystyrene film hydrophilic, coating the hydrophilic surface with an aqueous solution of a polyvinyl alcohol having a 4% viscosity of from 2 to 50 centiposises and evaporating the solvent from said solution, printing images and characters thereon with a glycol based printing ink.

8. Method for the preparation of polystyrene film able to receive and retain sharply defined wet pictorial images and literal numerical characters at elevated temperatures without feathering comprising rendering a surface of biaxially oriented polystyrene film hydrophilic, coating the hydrophilic surface with an aqueous solution of a substantially completely hydrolyzed polyvinyl alcohol having a 4% viscosity of from 4 to 32 centipoises and evaporating the solvent from said solution prior to printing images and characters there with a glycol based printing ink.

9. Method for the preparation of polystyrene film able to receive and retain sharply defined wet pictorial images and literal and numerical characters at elevated temperatures without feathering comprising rendering a surface of the polystyrene film hydrophilic, coating the hydrophilic surface with an alcohol and water solution of an at least 88% hydrolyzed polyvinyl alcohol having a 4% viscosity of from 4 to 32 centipoises and evaporating the water and alcohol from said solution, printing images and characters thereon with a glycol based printing ink.

10. Method for the preparation of polystyrene film able to receive and retain sharply defined wet pictorial images and literal and numerical characters at elevated temperatures without feathering comprising rendering a surface of biaxially oriented polystyrene film hydrophilic, coating the hydrophilic surface with an alcohol and water solution of a 99% hydrolyzed polyvinyl alcohol having a 4% viscosity of from 4 to 6 centipoises, and evaporating the water and alcohol from said solution prior to printing images and characters thereon with a glycol based printing ink.

References Cited in the file of this patent

UNITED STATES PATENTS

| | | |
|---|---|---|
| 2,463,282 | Kang | Mar. 1, 1949 |
| 2,519,004 | Stockfeld | Aug. 15, 1950 |
| 2,561,402 | Nelson | July 24, 1951 |
| 2,604,006 | Hartman | July 22, 1952 |
| 2,668,134 | Horton | Feb. 2, 1954 |
| 2,860,801 | Nielsen | Nov. 18, 1958 |
| 2,875,056 | Smith et al. | Feb. 24, 1959 |
| 2,880,898 | Navikas | Apr. 7, 1959 |